(12) United States Patent
Kodialam et al.

(10) Patent No.: US 7,729,257 B2
(45) Date of Patent: Jun. 1, 2010

(54) METHOD AND APPARATUS FOR LINK TRANSMISSION SCHEDULING FOR HANDLING TRAFFIC VARIATION IN WIRELESS MESH NETWORKS

(75) Inventors: Muralidharan Sampath Kodialam, Marlboro, NJ (US); Tirunell V. Lakshman, Morganville, NJ (US); Sudipta Sengupta, Malden, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1011 days.

(21) Appl. No.: 11/394,372

(22) Filed: Mar. 30, 2006

(65) Prior Publication Data

US 2007/0237081 A1    Oct. 11, 2007

(51) Int. Cl.
*H04J 1/16* (2006.01)
(52) U.S. Cl. .................................... 370/235
(58) Field of Classification Search .............. 370/235, 370/400, 401, 402, 389, 395.4, 395.21, 395.41, 370/458, 455, 468, 442, 441, 252, 322, 310.2, 370/328, 329, 338, 341
See application file for complete search history.

(56) References Cited

U.S. PATENT DOCUMENTS

| | | | |
|---|---|---|---|
| 5,467,345 A | 11/1995 | Cutler, Jr. et al. | |
| 7,333,458 B2 * | 2/2008 | Cain | 370/337 |
| 2004/0001442 A1 | 1/2004 | Rayment et al. | |
| 2004/0156345 A1 | 8/2004 | Steer et al. | |
| 2005/0208949 A1 | 9/2005 | Chiueh | |

OTHER PUBLICATIONS

International Search Report & Written Opinion in corresponding PCT/US2007/006756, Nov. 16, 2007, Lucent Technologies Inc.

* cited by examiner

*Primary Examiner*—Brenda Pham
(74) *Attorney, Agent, or Firm*—Wall & Tong, LLP (57) ABSTRACT

The invention includes a method and apparatus for generating a link transmission schedule for handling traffic variation in wireless networks without dynamic scheduling or routing. The method includes determining fixed traffic capacities associated with respective wireless links of a wireless network according to a routing algorithm, and generating, using the routing algorithm and the fixed traffic capacities, a link transmission schedule including at least one condition by which traffic is transmitted using each of the network links. The link transmission schedule is adapted to remain substantially fixed during dynamic traffic changes. The routing algorithm may be a two-phase routing algorithm in which traffic is distributed by each node in the wireless network to every node in the wireless network using traffic split ratios. For two-phase routing, fixed traffic capacities may be determined using ingress and egress traffic capacities and traffic split ratios associated with respective nodes in the wireless network.

21 Claims, 6 Drawing Sheets

METHOD AND APPARATUS FOR LINK TRANSMISSION SCHEDULING FOR HANDLING TRAFFIC VARIATION IN WIRELESS MESH NETWORKS

FIELD OF THE INVENTION

The invention relates to the field of communication networks and, more specifically, to routing and scheduling in wireless networks.

BACKGROUND OF THE INVENTION

Interest in use of wireless mesh networks (WMNs) for new applications such as community wireless networks and networks requiring rapid deployment, as well as for increasing the coverage and capacity of traditional wireless networks, is increasing. The increasing interest in WMNs is primarily due to lowered need for wired infrastructure support, as well as falling prices of wireless components. Disadvantageously, however, although operationally similar to a wired backbone network, use of wireless links in WMNs presents several unique challenges, such as generating sufficient throughput from the system, guaranteeing quality of service for end users, and scaling the network to a large number of nodes. A variety of approaches have been attempted for addressing such challenges.

In one approach, physical layer improvements (e.g., using multiple channels, multiple antennas with space-time coding, and directional antennas for minimizing interference) are implemented for improving the throughput of WMNs. In another existing approach, since standard single-hop media access control (MAC) does not work well in multi-hop networks, existing MAC layers have been redesigned and new MAC layers have been proposed (e.g., a MAC layer tuned to an underlying physical layer). In another existing approach, protocols (e.g., routing protocols such as link quality based routing protocols and network protocols such as new TCP variants) developed for ad hoc mobile networks have been pared down in an effort to render the protocols suitable for use in WMNs.

In spite of some of progress of existing approaches in achieving increased data rates at the physical layer, due to further MAC layer and routing protocol limitations, increased physical layer data rates in multi-hop wireless networks have not resulted in increased throughput at the application layer. Furthermore, such inefficiencies of MAC layers and routing protocols may be exacerbated in moderate-sized networks in which traffic must traverse multiple hops between source and destination. Thus, although some minor improvements in network throughput of WMNs may be achieved by existing processes utilizing dynamic routing and scheduling, such throughput improvements are insufficient for supporting widespread adoption of WMNs.

SUMMARY OF THE INVENTION

Various deficiencies in the prior art are addressed through the invention of a method and apparatus for generating a link transmission schedule. The method includes determining a plurality of fixed traffic capacities associated with a respective plurality of network links of a wireless network according to a routing algorithm, and generating, using the routing algorithm and the fixed traffic capacities, the link transmission schedule including at least one condition by which traffic is transmitted using each of the network links. The link transmission schedule is adapted to remain substantially fixed during traffic changes. The routing algorithm may include a two-phase routing algorithm in which traffic is distributed by each node in the wireless network to every node in the wireless network according to traffic split ratios. For a wireless network using the two-phase routing algorithm, fixed traffic capacities may be determined using ingress and egress traffic capacities and traffic split ratios associated with each node in the wireless network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention simplifies network control and improves network throughput of wireless mesh networks by avoiding fixed dynamic resource allocation. The present invention enables static routing using a fixed link transmission schedule for efficiently supporting variable traffic in wireless mesh networks. The static routing using a fixed link transmission schedule obviates the need for complicated dynamic network controls (e.g., dynamic routing, dynamic link transmission scheduling, dynamic media access control, and the like), thereby simplifying network control in wireless mesh networks. The static routing using a fixed link transmission schedule guarantees each wireless node a fixed, long-term throughput independent of traffic matrix changes.

The present invention determines a fixed link transmission schedule by which wireless nodes in a wireless network transmit traffic using a routing algorithm. The routing algorithm is configured to establish fixed traffic capacities on respective network links of the wireless network. Since actual traffic flow within a network may vary, a fixed traffic capacity is an average fixed traffic capacity (i.e., average traffic capacity on each network link is fixed). The fixed link transmission schedule is determined using the routing algorithm and associated fixed traffic capacities. The routing algorithm may be processed for determining fixed traffic capacities required for determining the link transmission schedule. By ensuring fixed traffic capacities associated with respective network links, the present invention enables use of static routing and link transmission scheduling in wireless networks, thereby simplifying network control and improving network throughput.

In one embodiment, traffic routing within the wireless mesh network may be performed using a two-phase routing algorithm. In this embodiment, traffic is distributed, in a first transmission phase, from source nodes to intermediate nodes according to traffic split ratios, and, traffic is routed, in a second transmission phase, from the intermediate nodes to the associated destination nodes. In this embodiment, using ingress traffic and egress traffic associated with each wireless node, traffic split ratios may be determined for each wireless node in the first transmission phase, which, when applied to the wireless mesh network, result in fixed traffic capacities on each network link in the wireless mesh network. In one embodiment, traffic split ratios may be determined by solving a routing algorithm formulation for satisfying at least one link transmission scheduling constraint.

The fixed link transmission schedule is determined from the routing algorithm and fixed traffic capacities. In one embodiment, the fixed link transmission schedule may be determined using an edge coloring algorithm. The fixed link transmission schedule is communicated to the wireless nodes for use in conjunction with the routing algorithm for routing traffic through the wireless mesh network. The routing algorithm is static, thereby obviating any need for performing dynamic routing changes in response to network conditions. The link transmission schedule is static, thereby obviating any need for performing link transmission scheduling changes in response to network conditions, link transmission scheduling constraints, and the like.

Figure 1:
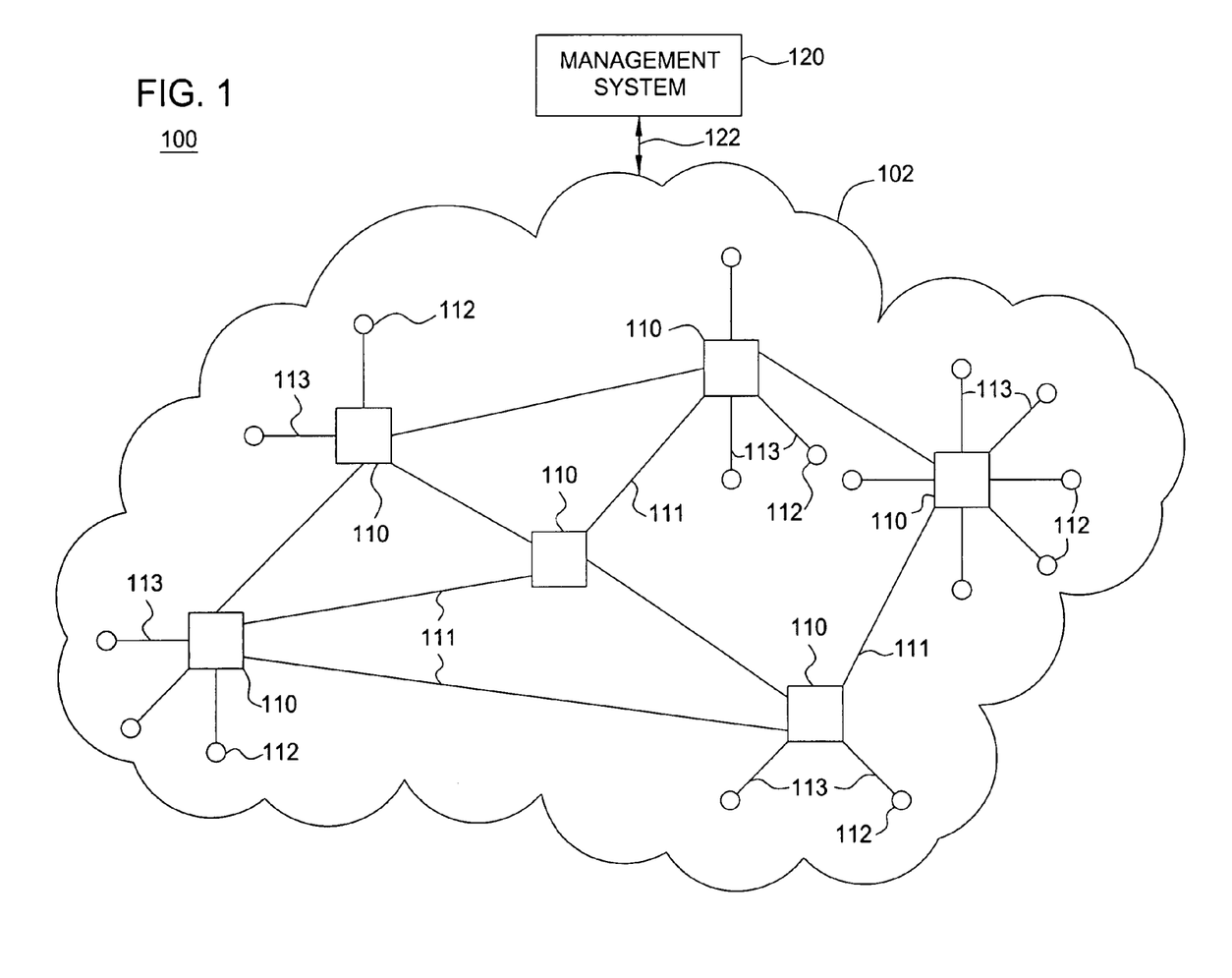
FIG. 1 depicts a high-level block diagram of a communication network.

FIG. 1 depicts a high-level block diagram of a communication network. Specifically, communication network 100 of FIG. 1 includes a wireless mesh network (WMN) 102 and a management system 120. As depicted in FIG. 1, WMN 102 includes a plurality of nodes 110 (collectively, nodes 110) and a plurality of terminals 112 (collectively, terminals 112). As depicted in FIG. 1, WMN 102 may be implemented using any wireless communication technology (e.g., Time Division Multiple Access (TDMA), Code Division Multiple Access (CDMA), and the like, as well as various combinations thereof).

As depicted in FIG. 1, nodes 110 communicate using a plurality of network links (NLs) 111 (collectively, NLs 111). As depicted in FIG. 1, terminals 112 communicate with nodes 110 using a respective plurality of access links (ALs) 113 (collectively, ALs 113). The NLs 111 include wireless links. The ALs 113 may include wireline links or wireless links. For purposes of clarity, links (illustratively, NLs 111 and ALs 113) are depicted herein as a single connection; however, each link may be physically implemented as a pair of directional links. For example, although depicted herein as single connections, each NL 111 may include a pair of directed wireless links (e.g., a wireless link to another wireless node and a wireless link from another wireless node). Similarly, each AL 113 may include a pair of links.

The nodes 110 include wireless nodes operable for supporting wireless communications. The nodes 110 are operable for supporting packet-based communications, as well as performing routing, channel assignment, and like functions, as well as various combinations thereof. The nodes 110 implement a routing algorithm adapted for ensuring fixed traffic capacities on NLs 111. In one embodiment, nodes 110 include fixed nodes. In one embodiment, at least a portion of nodes 110 include mobile nodes. The nodes 110 include at least one antenna (omitted for purposes of clarity). The antennas may include narrow beam forming antennas, omnidirectional antennas, and the like. Although, for purposes of clarity, each node 110 is described herein as having one associated antenna, in one embodiment, at least a portion of nodes 110 may include more than one antenna.

The terminals 112 include devices operable for communicating over a wireless mesh network (illustratively, WMN 102). In one embodiment, terminals 112 include wireless communication devices. In one embodiment, at least a portion of terminals 112 include wireline communication devices. In one embodiment, at least a portion of terminals 112 include end-user terminals (e.g., mobile phones, computers, and the like). In one embodiment, at least a portion of terminals 112 include gateway elements adapted for enabling various communication devices (not depicted) to interface with wireless nodes of wireless mesh networks. The terminals 112 are primarily discussed herein as wireless communication devices.

In one embodiment, WMN 102 is implemented as a time-slotted system in which nodes 110 share frequency spectrum (i.e., a hybrid CDMA-TDMA system). In one such embodiment, in each timeslot, a subset of links in WMN 102 (illustratively, NLs 111 and ALs 113) may be active (as specified by a link transmission schedule). As described herein, a link transmission schedule is determined using a routing algorithm implemented in a manner for ensuring a fixed traffic capacity on each network link, as well as the fixed traffic capacities. In one embodiment, implementation of the routing algorithm may require solution of a routing algorithm formulation adapted for ensuring that network links transport respective fixed traffic capacities. In one embodiment, a routing algorithm formulation may account for at least one link transmission scheduling constraint.

Although primarily described herein with respect to a routing algorithm formulation accounting for a specific link transmission scheduling constraint (i.e., utilization commitment vector), various other routing algorithm formulations may be utilized to account for various other link transmission scheduling constraints (e.g., minimizing link interference, minimizing cross-provider conflict, and the like). For example, since the transmission rate achievable on a given link in a given timeslot is a function of the signal-to-interference-and-noise ratio, link transmission schedule determination may be performed for minimizing link interference for maximizing data rates of active links. In general, link transmission scheduling constraints may depend on various characteristics such as physical layer characteristics, transmission power characteristics, antenna characteristics, and the like, as well as various combinations thereof.

As described herein, link transmission scheduling constraints may depend on antenna characteristics. In one embodiment, in which wireless nodes utilize narrow beam forming antennas, interference caused by an active link on any other link can be assumed to be negligible. In this embodiment, the only requirement imposed on the system is that a wireless node cannot simultaneously transmit/receive data to/from multiple other wireless nodes in a single timeslot (i.e., this embodiment described an ideal beam forming system). In a practical beam forming system, formation of beams less than five-ten degrees is difficult, resulting in at least some level of interference from neighboring links.

In one embodiment, in which wireless nodes utilize omnidirectional antennas, all transmissions in the vicinity of the receiver of a link interfere with transmissions on the link. In one such embodiment, if no effort is made to suppress such interference, the achieved data rate may be quite poor. In one embodiment, transmitters which strongly interfere with a link may be quieted using a MAC which ensures that all nodes within a particular range of the receiver of the link cannot be transmitting while the link is active. In one such embodiment, in which this condition is satisfied, the rate that can be achieved on the link is primarily a function of the power of the link and the channel gain of the link.

For purposes of simplicity, the present invention is primarily described herein within the context of a system in which beam forming antennas are used for communications (and all nodes transmit at a fixed power). For purposes of ease of exposition, the present invention is primarily described herein in the context of a system utilizing non-fading channels in which distance is related to channel attenuation. Although primarily described herein with respect to such simplifying assumptions, the present invention may be used for implementing fixed routing algorithms and determining fixed link transmission schedules in wireless mesh networks utilizing various other design parameters (e.g., utilizing omnidirectional antenna, utilizing fading channels, and the like), as well as various combinations thereof.

As depicted in FIG. 1, controller 120 performs at least a portion of the functions described herein. The controller 120 determines a routing algorithm adapted for ensuring fixed traffic capacities on network links of WMN 102. In one embodiment, controller 120 processes a routing algorithm formulation (defined in a manner for satisfying at least one link transmission scheduling constraint) for determining at least one routing parameter adapted for ensuring fixed traffic capacities on network links of WMN 102. The controller 120, using the routing algorithm and fixed traffic capacities, determines a link transmission schedule for nodes 110. As depicted in FIG. 1, controller 120 communicates with WMN 102 for distributing the link transmission schedule to nodes 110. The controller 120 performs at least a portion of the functions depicted and described herein with respect to FIG. 2-FIG. 4.

Figure 2:
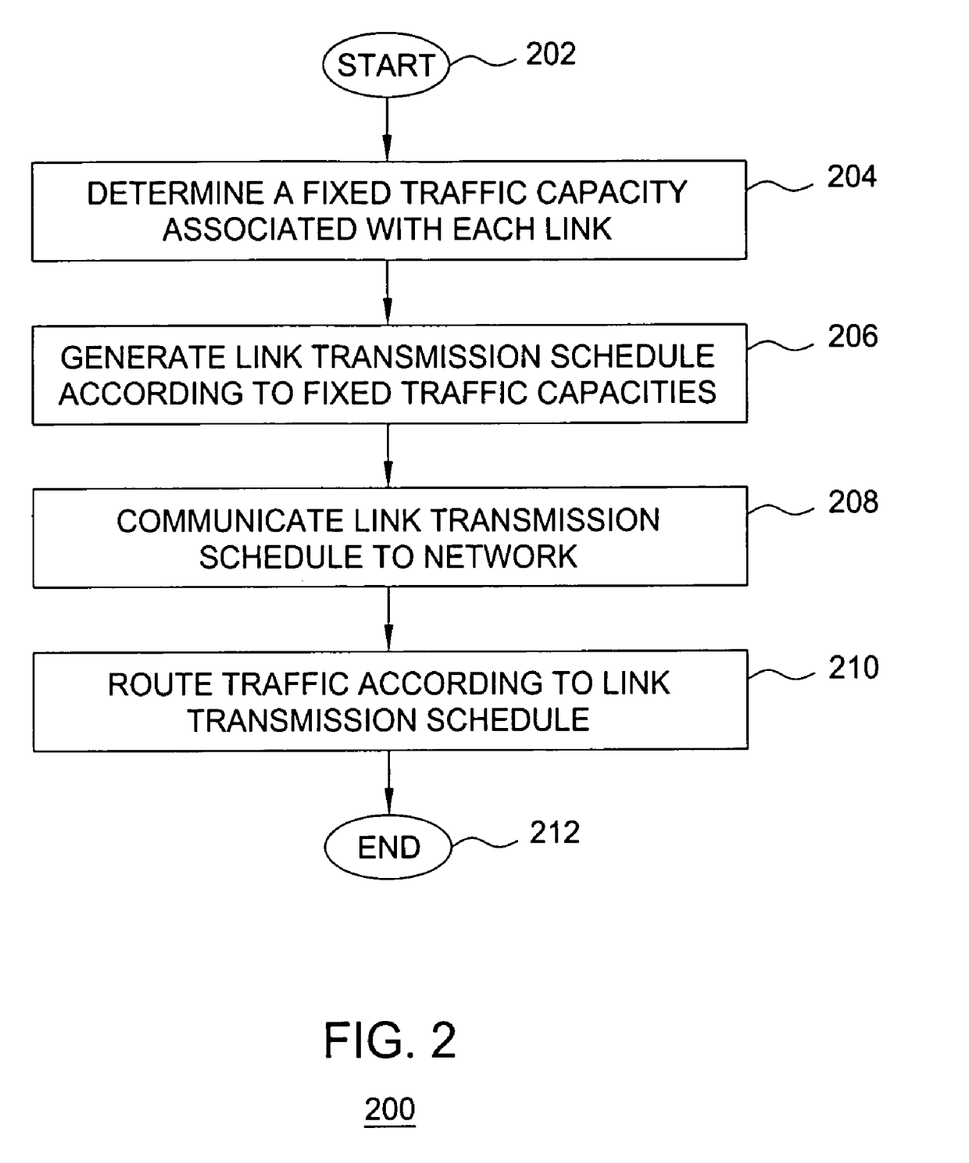
FIG. 2 depicts a method according to one embodiment of the present invention.

FIG. 2 depicts a method according to one embodiment of the present invention. Specifically, method 200 of FIG. 2 includes a method for configuring a wireless mesh network using fixed resource allocations defined as a link transmission schedule. Although depicted and described as being performed serially, those skilled in the art will appreciate that at least a portion of the steps of method 200 may be performed contemporaneously, or in a different order than presented in FIG. 2. The method 200 begins at step 202 and proceeds to step 204.

At step 204, a fixed traffic capacity associated with each link in a wireless mesh network is determined. In one embodiment, the fixed traffic capacity associated with each link is determined using a method depicted and described herein with respect to FIG. 3. At step 206, a link transmission schedule is generated. In one embodiment, the link transmission schedule is generated using the fixed traffic capacities. In one embodiment, the link transmission schedule is generated using the routing algorithm processed for determining the fixed traffic capacities. In one embodiment, the link transmission schedule is generated using a link transmission scheduling algorithm. In one such embodiment, the link transmission schedule may be generated using an edge coloring algorithm.

In one embodiment, a link transmission schedule is generated for the network (i.e., for all wireless nodes in the network). In one embodiment, a link transmission schedule generated for the network may be further processed to generate individual link transmission schedules specific to each wireless node in the network. In one embodiment, an individual link transmission schedule is generated for each wireless node. In one embodiment, a link transmission schedule includes at least one condition by which each of the network links transmits traffic within the network.

In one embodiment, conditions defining link transmissions within a wireless network may include at least one of a transmission time (e.g., a portion of a time slot in which a wireless node transmits using the wireless link, a time slot in which a wireless node transmits using the wireless link, a plurality of time slots in which a wireless node transmits using the wireless link, and the like), a transmission frequency at which the wireless node transmits using the wireless link, a transmission power at which the wireless node transmits using the wireless link, a receiver (i.e., wireless node) to which the wireless node transmits using the wireless link, and like conditions, as well as various combinations thereof.

At step 208, the link transmission schedule is communicated to each wireless node of the network. In one embodiment, in which a link transmission schedule is generated for the wireless network, the full link transmission schedule may be transmitted to each wireless node. In one embodiment, in which a link transmission schedule is further processed to produce individual link transmission schedules associated with respective wireless nodes, individual link transmission schedules may be transmitted to respective wireless nodes. At step 210, traffic within the wireless network is routed according to the routing algorithm using the link transmission schedule. At step 210, method 200 ends.

Although omitted due to the generally fixed nature of link transmission scheduling in wireless mesh networks (fixed on the order of minutes, hours, days, months, and potentially longer periods) in one embodiment, a fixed link transmission schedule may be modified. In one such embodiment, a fixed link transmission schedule may be modified in response to a change in one or more fixed traffic capacities associated with the network links. In one embodiment, a change in one or more fixed traffic capacities associated with the network links may be a result of a change to the routing algorithm utilized within the network. In one embodiment, a change in one or more fixed traffic capacities associated with the network links may be a result of a change to network (e.g., a network configuration change, a node capacity change, and the like, as well as various combinations thereof).

For example, in a wireless mesh network utilizing a two-phase routing algorithm such that fixed traffic capacities depend on ingress and egress traffic capacities at each node, a change in capacity of one of the nodes (e.g., an additional line card operable for supporting additional network traffic is added to a node) results in a change to the fixed traffic capacities of the network links associated with the node, thereby requiring a change to the link transmission schedule. In other words, although fixed link transmission scheduling provided by the present invention may remain fixed for a substantially longer period of time than provided by existing link transmission schedulers, the present invention does enable modifications to the fixed link transmission schedule required in response to various changes.

Figure 3:
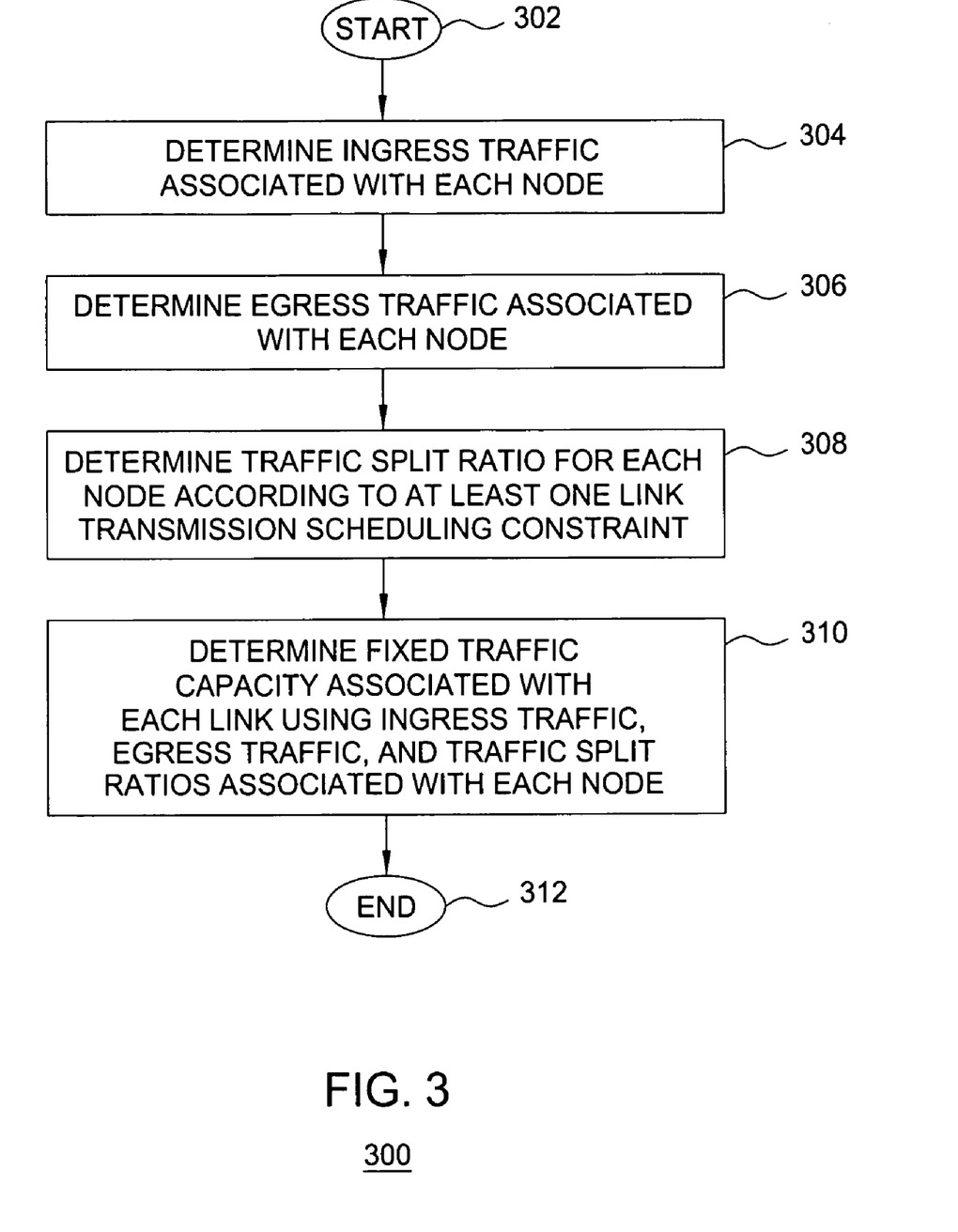
FIG. 3 depicts a method according to one embodiment of the present invention.

FIG. 3 depicts a method according to one embodiment of the present invention. Specifically, method 300 of FIG. 3 includes a method for determining a fixed traffic capacity associated with each link of a wireless mesh network utilizing a two-phase routing algorithm. Although described with respect to determining a fixed traffic capacity for each link of a wireless mesh network utilizing a two-phase routing algorithm, method 300 may be adapted for determining fixed traffic capacity for links of a wireless mesh network utilizing various other routing algorithms. Although depicted and described as being performed serially, those skilled in the art will appreciate that at least a portion of the steps of method 300 may be performed contemporaneously, or in a different order than presented in FIG. 3. The method 300 begins at step 302 and proceeds to step 304.

At step 304, ingress traffic associated with each node is determined. At step 306, egress traffic associated with each node is determined. In one embodiment, ingress and egress traffic associated with each node is a maximum capacity of ingress traffic and a maximum capacity of egress traffic supported by each node, respectively. In one such embodiment, ingress and egress traffic associated with each node is determined according to ingress and egress capacity associated with each node (e.g., line cards associated with each node), respectively. In this embodiment, ingress traffic and egress traffic associated with each node may be determined using a node profile associated with each node (illustratively, node profiles stored locally by controller 120).

At step 308, traffic split ratios associated with each node are determined. In one embodiment, traffic split ratios associated with each node are determined by solving a routing algorithm formulation of a routing algorithm (e.g., two-phase routing) for which traffic split ratios are determined. As described herein, traffic split ratios associated with each node define distribution of traffic among other nodes in the network in a first routing phase. In one embodiment, traffic split ratios may define distribution of traffic irrespective of traffic destination. In one embodiment, traffic split ratios associated with each node are determined in a manner for satisfying at least one link transmission scheduling constraint. In one embodiment, traffic split ratios associated with each node are determined using a method depicted and described herein with respect to FIG. 4.

At step 310, a fixed traffic capacity associated with each link is determined. In one embodiment, the fixed traffic capacity associated with each link is determined using the ingress traffic capacity, egress traffic capacity, and traffic split ratios associated with each node. In one embodiment, fixed traffic capacities associated with respective links may be determined by solving a routing algorithm formulation of the routing algorithm for which traffic split ratios are determined. In one embodiment, the fixed traffic capacity associated with a link is an average capacity of traffic traversing the link. As described herein, fixed traffic capacities associated with links of a wireless mesh network may be used, in conjunction with the routing algorithm processed for determining the fixed traffic capacities, for determining a link transmission schedule. At step 312, method 300 ends.

The present invention, by configuring a routing algorithm adapted for ensuring fixed traffic capacities on links within a wireless mesh network, enables improved network throughput using a static link transmission schedule determined using the routing algorithm and associated fixed traffic capacities. In one embodiment, in which the routing algorithm is a two-phase routing algorithm, configuration of the routing algorithm may include determining traffic split ratios associated with nodes of the wireless mesh network. The traffic split ratios may be determined by solving a specific formulation of the routing algorithm adapted for satisfying at least one link transmission scheduling constraint. A detailed description of a method for determining traffic split ratios while satisfying a specific link transmission scheduling constraint (utilization commitment vector $\beta$) is provided herein below.

In one embodiment, WMN 102 may be described within the context of a notation in which WMN 102, a topology including pairs of nodes within direct communication range, is modeled as a graph G=(N,E) including a node set N and a directed link set E. As described herein, each node in node set N may operate as a source node, an intermediate node, and a destination node. In one notation, let |N|=n and |E|=m. In one notation, sets of incoming and outgoing links at node i are denoted by $E_-(i)$ and $E_+(i)$, respectively. In one notation, a directed link in the network from node i to node j is denoted as (i, j). To simplify the notation, a link may also be denoted as e (i.e., edge e) rather than notation (i,j). In one notation, the capacity of link (i,j) will be denoted as $U_{ij}$.

In one embodiment, each node 110 in WMN 102 shares spectrum resources, radio resources, and the like, as well as various combinations thereof (collectively denoted as resources) between network links (illustratively, NLs 111) connected to the node 110 (from other nodes 110) and access links (illustratively, ALs 113) connected to the node 110 (from associated WTs 112). In one embodiment, of the resources made available to the wireless terminals via the access links, some portion of the resources are utilized for uplink transmission from the wireless terminal to the node and the remainder of the resources are utilized for downlink transmission from the node to the wireless terminal.

In one embodiment, node commitment to the network may be defined. In one embodiment, the present invention decouples the access links and the network links. In one embodiment, decoupling of the access links and network links is achieved using a utilization commitment vector. In one embodiment, a maximum fraction $\beta_i$ of the utilization of node i (illustratively, one of the nodes 110) is committed to support network links associated with node i (i.e., node i spends, at most, a fraction $\beta_i$ of transmission time available to node i transmitting on the network links associated with node i and a fraction $(1-\beta_i)$ of transmission time available to node I transmitting on the access links associated with node i). The vector $\beta$ (including $\beta_i$ for each node i in the network) is denoted herein as the node utilization commitment vector.

In one embodiment, an assumption is made that network links at node i have precedence over access links at node i in the sense that network link transmission scheduling is performed prior to access link transmission scheduling, however, despite such precedence, network links at node i are constrained from utilizing greater than a fraction $\beta_i$ of the utilization of node i. In one embodiment, in which resources for the network links at node i are not shared with resources for the access links at node i, utilization commitment $\beta_i$ for node i is equal to one (i.e., $\beta_i=1$). For example, although not depicted, in one embodiment, one or more of the nodes 110 may be deployed as a backhaul node supporting only network links (i.e., not allowing access by wireless terminals).

In one embodiment, network guarantee to the nodes may be defined. In one embodiment, the network guarantee to the nodes may be a data rate guarantee. In one embodiment, in exchange for routing traffic on the network (illustratively, WMN 102), the network guarantees node i (illustratively, one of the nodes 110) transport of an ingress data rate of $R_i$ from node i and an egress data rate of $C_i$ to node i. In one embodiment, the data rate guarantee is independent of the source of the incoming traffic (denoted ingress traffic) and the destination of the outgoing traffic (denoted egress traffic). The vector (R,C) (including $(R_i,C_i)$ values for each node i in the network) is denoted as the data rate guarantee vector. In one embodiment, data rate guarantee vector (R,C) may be determined according to respective capacities of nodes of the network.

In one embodiment, given a network configuration and utilization commitment vector p, a given data rate guarantee vector (R,C) may or may not be achievable. In one embodiment, this achievability problem may be formulated as: determining a largest scalar A such that data rates $\lambda(R, C)$ are achievable. If $\lambda<1$, given data rate vector (R,C) is not achievable. If $\lambda \geq 1$, given data rate vector (R,C) is achievable. In one embodiment, the various modeling assumptions described herein may be utilized for formulating a routing algorithm problem, the solution of which enables implementation of the routing algorithm in a manner for ensuring fixed traffic capacities on respective network links. In one such embodiment, in which the routing algorithm is a two-phase routing algorithm, solution of the routing algorithm formulation may specify traffic split ratios associated with respective nodes, the traffic split ratios adapted for ensuring fixed traffic capacities on respective network links.

In one embodiment, an assumption may be made that the node utilization commitment vector β is given and data rate guarantee vector (R,C) is given. The data rate guarantee vector (R,C) is independent of the traffic matrix (i.e., traffic pattern). In one embodiment, the present invention ensures that any traffic matrix that does not violate the data rate guarantee vector (R,C) can be routed through the network using a routing algorithm. In one such embodiment, traffic split ratios may be used in conjunction with data rate guarantee vector for ensuring fixed traffic capacities on respective network links. In one further embodiment, the present invention ensures that a link transmission schedule can be generated to meet the bandwidth required by the routing algorithm (as specified by the data rate guarantee vector (R,C) and associated traffic split ratios).

The routing implications may be described as follows. The point-to-point matrix for traffic in the network is constrained by the data rate guarantee vector (R,C). The data rate guarantee vector constraints are the only known aspects of the traffic to be carried by the network, and knowing the constraints is equivalent to knowing the row and column sum bounds on the traffic matrix. In other words, any allowable traffic matrix $T=[t_{ij}]$ for the network must obey Eq; 1. For given $R_i$ and $C_i$ values, T(R,C) denotes the set of all such traffic matrices that are partially specified by the row and column sums of the traffic matrices, as given by Eq. 2. In one embodiment, traffic distribution T may be any traffic matrix in T(R,C), and may change over time. In one embodiment, a routing algorithm of the present invention makes no assumptions about T, other than that T is partially specified by row and column sum bounds.

$$\sum_{j:j\neq i}^{n} t_{ij} \leq R_i \text{ and } \sum_{j:j\neq i}^{n} t_{ij} \leq C_i \text{ for } \forall\, i \in N \qquad \text{Eq. 1}$$

$$T(R, C) = \left\{ [t_{ij}] \;\middle|\; \sum_{j\neq i} t_{ij} \leq R_i \text{ and } \sum_{j\neq i} t_{ij} \leq C_i \text{ for } \forall\, i \right\} \qquad \text{Eq. 2}$$

In one embodiment, in which transmissions within a wireless mesh network use narrow beam-forming directional antennas, during transmission on link e in the network, the transmitting node for link e (illustratively, one of the nodes 110) or the receiving node for link e (illustratively, one of the nodes 110) cannot be transmitting to or receiving from any other node of the wireless mesh network (or, alternatively, within a certain distance of a transmitting and receiving nodes of link e). In one embodiment, in which fixed transmission powers and non-fading channels are implemented, an achievable data rate for link e (denoted as c(e)) is a constant (i.e., a fixed traffic capacity associated with link e is ensured). In one such embodiment, in which a routing algorithm of the present invention transmits a flow of x(e) on link e, the fraction of time link e is used (denoted as f(e)) is given by: f(e)=x(e)/c(e).

In one embodiment, given any node v in a wireless mesh network (illustratively, any node 110 in WMN 102), N(v) may be used to denote the set of links whose transmitter or receiver is node v. Since the utilization of the network links of any node v in the network must be less than $\beta_v$, a condition required in order for the links of node v to be schedulable may be derived (as in Eq. 3). In one embodiment, the derived condition (as in Eq. 3) may be adapted for deriving an associated condition in order for the schedule to be achievable (as in Eq. 4). In one embodiment, the condition may be used for determining a routing algorithm adapted for satisfying the condition (as well as for defining a formulation of the routing algorithm which, when solved, ensured fixed traffic capacities associated with each link of the wireless mesh network).

$$\sum_{e\in N(v)} f(e) = \sum_{e\in N(v)} x(e)/c(e) \leq \beta_v \qquad \forall\, v \qquad \text{Eq. 3}$$

$$\sum_{e\in N(v)} f(e) = \sum_{e\in N(v)} x(e)/c(e) \leq \frac{2}{3}\beta_v \qquad \forall\, v \qquad \text{Eq. 4}$$

In one embodiment, a routing algorithm is adapted to produce a routing algorithm formulation which may be solved in a manner for satisfying at least one condition (e.g., including network conditions, link transmission scheduling constraints, and the like, as well as various combinations thereof). Although primarily described herein with respect to specific network conditions (e.g., directional antennas) and a specific link transmission scheduling constraint (i.e., utilization commitment vector β), routing algorithm formulations may be defined for satisfying various other network conditions, link transmission scheduling constraints, and like conditions and constraints, as well as various combinations thereof.

In one embodiment, with respect to network conditions, a routing algorithm formulation may be designed for systems utilizing omnidirectional antennas (as opposed to a system utilizing directional antennas, as described herein). In one embodiment, with respect to link transmission scheduling constraints, a routing algorithm formulation may be designed for satisfying transmission power constraints, cross-provider link transmission constraints, and the like, as well as various combinations thereof. Although primarily described herein with respect to network conditions and link transmission scheduling constraints, in one embodiment, a routing algorithm formulation, solution of which ensures fixed traffic capacities on network links, may be defined in a manner for accounting for other conditions, satisfying other constraints, and the like, as well as various combinations thereof.

In one embodiment, given a node utilization commitment vector β and a data rate guarantee vector (R,C), the present invention guarantees the data rate guarantee vector (R,C), independent of the traffic pattern of the network, using a determined routing algorithm. A link transmission schedule is determined according to the routing algorithm and fixed traffic capacities associated with respective network links (where the fixed traffic capacities are determined based on the routing algorithm and the data rate guarantee vector (R,C)). In one embodiment, a link transmission scheduling algorithm may be used for determining the link transmission schedule according to the routing algorithm and associated fixed traffic capacities ensured by the routing algorithm.

In one embodiment, the routing algorithm is a two-phase routing algorithm. In one such embodiment, the proposed two-phase routing scheme has the property that the amount of bandwidth required to implement the proposed two-phase routing scheme is only a function of node utilization commitment vector β and data rate guarantee vector (R,C) (i.e., proposed two-phase routing scheme is independent of the traffic pattern). In one embodiment, in a first phase, a predetermined fraction $\alpha_j$ (denoted as traffic split ratios α) of the traffic entering the wireless mesh network at any node (illustratively, any of the nodes 110 of WMN 102) is distributed to every node j independent of the final destination of the traffic. In one embodiment, prior to implementation of the two-phase routing scheme, traffic split ratios α operable for achieving the data rate guarantee vector (R,C) may be determined.

In one embodiment, a linear programming problem is formulated for determining the optimal data rate guarantee (i.e., for ensuring fixed traffic capacities on respective network links) under the two-phase routing algorithm. In one such embodiment, the linear programming problem is solved in a manner for satisfying at least one link transmission scheduling constraint (utilization commitment vector β) for determining an optimum data rate guarantee under the two-phase routing algorithm. In one embodiment, solution of the linear programming problem formulated according to the two-phase routing algorithm outputs traffic split ratios which, upon implementation within the network, produce fixed traffic capacities (i.e., link flows) on respective network links in the network.

In one embodiment, fixed traffic capacities may be used, in conjunction with specifics of the associated two-phase routing algorithm, for determining an associated link transmission schedule defining various specifics of link transmission on network links. In one such embodiment, a link transmission schedule may be determined using a link transmission scheduling algorithm. In one embodiment, the link transmission scheduling algorithm is an edge coloring algorithm. In one such embodiment, each color of the edge coloring algorithm corresponds to a time slot, and all links having the same color transmit simultaneously in that time slot. In one such embodiment, greedy edge coloring may be utilized for translating the link flow for each link in the network into a link schedule.

As described herein, in one embodiment, the routing algorithm is a two-phase routing algorithm. In the first phase, a predetermined fraction $\alpha_j$ of the traffic entering the wireless mesh network at any node (illustratively, any of the nodes 110 of WMN 110) is distributed to every node j independent of the final destination of the traffic. In the second phase, as a result of the distribution in the first phase, each node receiving traffic destined for different destination nodes routes the received traffic to the associated destination nodes. In one embodiment, implementation of a two-phase routing algorithm in a wireless mesh network may be performed by establishing fixed-bandwidth paths between nodes. In one such embodiment, in order to distinguish paths conveying first phase traffic and second phase traffic, the paths may be referred to a first phase paths and second phase paths, respectively.

As described herein, using a two-phase routing algorithm, fixed traffic capacities may be established on respective network links. The two-phase routing algorithm ensures that the bandwidth required for the first phase paths and second phase paths only depends on the ingress capacities $R_i$ and egress capacities $C_i$, respectively (and does not depend on the (unknown) individual entries in the traffic matrix). The two-phase routing algorithm satisfies both bandwidth guaranteed services requirements and rendezvous-based services requirements, while enabling the network to accommodate arbitrary (and possibly rapidly changing) traffic demands without dynamic adaptation of network routing and scheduling. In fact, the two-phase routing algorithm does not even require the network to detect changes in the traffic distribution.

In the two-phase routing algorithm, in which traffic split ratios $\alpha_1, \alpha_2, \ldots \alpha_n$ satisfy $\Sigma \alpha_i = 1$ (summed over i=1 through N), consider a node i with maximum ingress traffic $R_i$. The node i sends $\alpha_j R_i$ amount of ingress traffic $R_i$ to node j during the first phase for each node j∈N. In other words, $\alpha_j R_i$ is the demand from node i to node j during the first phase. Following traffic distribution in the first phase, node i has received $\alpha_j R_k$ amount of traffic from any other node k in the network. Since all traffic in the network is split in the first phase without regard to the final destination of the traffic, from this $\alpha_j R_k$ amount of traffic received by node i from any other node k in the network, $\alpha_i t_{kj}$ amount of traffic is destined for node j. The maximum amount of traffic that must be routed from node i to node j in the second phase is $\Sigma_{k \in N} \alpha_i t_{kj} = \alpha_i C_j$. In other words, $\alpha_i C_j$ is the demand from node i to node j during the second phase.

In the two-phase routing algorithm, the maximum demand from node i to node j as a result of routing in the first phase and the second phase is $(\alpha_j R_i + \alpha_i C_j)$, which is independent of matrix T∈T(R,C). The two-phase routing algorithm ensures that the routing of source-destination traffic is along fixed paths with predetermined distribution ratios. In other words, the two-phase routing algorithm results in traffic routing that is oblivious to traffic variations. The two-phase routing algorithm ensures that the total demand between nodes i and j as a result of routing in the first phase and second phase is $t'_{ij} = (\alpha_j R_i + \alpha_i C_j)$, thereby ensuring fixed traffic capacities on each network link in the network (and making the total demand dependent only on the row and column sum bounds that constrain T (i.e., T∈T(R,C)). In other words, the two-phase routing scheme handles variability in traffic matrix T∈T(R,C) by effectively routing a transformed matrix T'= $[t'_{ij}]$ depending only on the row and sum column bounds and traffic split ratios α.

In the two-phase routing algorithm, distribution decisions at each source node in the first phase comprise local decisions (i.e., do not require network-wide state information), and routing decisions at each intermediate node are based on packet destinations (i.e., do not require network-wide state information). The two-phase routing algorithm ensures traffic flows, providing the amount of traffic that flows on each link of the wireless mesh network (i.e., fixed traffic capacities associated with respective network links) independent of the actual traffic matrix. As described herein, by determining the traffic split ratios $\alpha_i$, and considering link transmission scheduling constraints, a link transmission schedule may be determined for scheduling the traffic flows. The two-phase routing algorithm is oblivious of, and robust to, any changes in traffic distribution, provides end-to-end bandwidth guarantees, and does not require any real-time reconfiguration of the network.

In a linear program formulation of the present invention, given a node utilization commitment vector β and a data rate guarantee vector (R,C), the largest scalar λ may be determined such that data rate guarantee vector (R,C) is achievable. For the achievable data rate guarantee vector (R,C), node i is guaranteed an ingress data rate of $\lambda R_i$ and an egress data rate of $\lambda C_i$. By letting λ·T(R,C) denote the set of all traffic matrices in T(R,C) having entries multiplied by λ, the linear programming formulation becomes equivalent to finding the maximum multiplier λ (i.e., throughput) such that all matrices in λ·T(R,C) may be routed in a manner for satisfying the link scheduling constraints. In one embodiment, a link flow based formulation may be solved. In one embodiment, a path flow based formulation may be solved.

In one embodiment, for a link flow based formulation, flow between a source and a destination may be denoted as a commodity, and k may be used to index commodities. The source and destination nodes for commodity k may be denoted by s(k) and d(k), respectively. The amount of flow of commodity k on link e may be denoted as xk(e). In this embodiment, there are two sets of decision variables: (1) distribution ratios $\alpha_i$ and (2) flows xk(e) on link e for commodity k. In this embodiment, demand for commodity k may be given by $\alpha_{s(k)} C_{d(k)} + \alpha_{d(k)} R_{s(k)}$. In one such embodiment, the link flow based formulation may be represented as maximizing $\Sigma \alpha_i$ for all nodes i∈N, subject to the following equations (Eq. 5-Eq. 7):

$$\sum_{e \in E^-(i)} x^k(e) = \sum_{e \in E^-(i)} x^k(e) \quad \forall \, i \neq s(k), d(k), \; \forall \, k \quad \text{Eq. 5}$$

$$\sum_{e \in \delta^+(i)} x^k(e) = \alpha_{s(k)} C_{d(k)} + \alpha_{d(k)} R_{s(k)} \quad i = s(k), \; \forall \, k \quad \text{Eq. 6}$$

$$\sum_{e \in N(i)} \frac{1}{u_e} \sum_k x^k(e) \leq \beta_i \quad \forall \, i \in N \quad \text{Eq. 7}$$

In this embodiment, letting $\alpha^*_i$ comprise the $\alpha_i$ values in an optimal solution of the link flow based formulation, throughput $\lambda^*$ is the optimum objective function value, i.e., $\lambda^* = \Sigma_i \alpha^*_i$. In this embodiment, the $\alpha^*_i$ values can be reduced by a factor of $\lambda^*$ in order to determine the actual distribution ratios $\alpha_i$ and the explicit paths along which demands are routed can be determined from the solution of the link flow based formulation. In one further embodiment, a link scheduling algorithm (e.g., edge coloring) may be utilized to determine whether the throughput is achievable.

In one embodiment, the link flow based formulation may be solved for determining routing and link scheduling in various embodiments of the present invention. Although the link flow based formulation is of polynomial size and is amenable for solution using an linear programming solver, it is well known that general linear programming based algorithms for network problems do not scale well with network size greater than a few tens of nodes. As such, in one embodiment, a Fully Polynomial Time Approximation Schemes (FPTAS) may be utilized for solving the link flow based formulation. In general, an FPTAS provides the following performance guarantees: for any $\epsilon > 0$, the solution has objective function value within $(1+\epsilon)$-factor of the optimal, and the running time is at most a polynomial function of the network size, number of traffic demands, and $1/\epsilon$.

In one embodiment, for a path flow based formulation, $P_{ij}$ may denote the set of all paths from node i to node j. In one such embodiment, x(P) denotes the traffic on path P. In general, a network may include a number of paths that is exponential in the size of the network. As such, a linear program (i.e., primal) implementation of the path flow based formulation may include an exponential number of variables, and the associated dual may include an exponential number of constraints, rendering both programs unsuitable for running in medium to large sized networks. In one embodiment, however, the primal and dual version of the path flow based formulation may be utilized for designing a fast combinatorial algorithm for solving the path flow based formulation. The path flow based formulation may be represented as maximizing $\Sigma \alpha_i$ for all nodes i∈N, subject to the following (Eq. 8-Eq. 9):

$$\sum_{P \in P_{ij}} x(P) = \alpha_j R_i + \alpha_i C_j \quad \forall \, i, j \in N, i \neq j \quad \text{Eq. 8}$$

$$\sum_{e \in N(i)} \frac{1}{u_e} \sum_{P: e \in P} x(P) \leq \beta_i \quad \forall \, i \in N \quad \text{Eq. 9}$$

As such, a path-indexed linear programming formulation may be utilized for developing a fast combinatorial algorithm for solving the path flow based formulation. In one embodiment, an approximation algorithm for computing traffic distribution ratios $\alpha_i$ may compute the traffic distribution ratios $\alpha_i$ up to $(1+\epsilon)$ factor of the optimal objective function value (i.e., maximum throughput) for an $\epsilon > 0$. In one such embodiment, the value of $\epsilon$ may be chosen to provide the desired degree of optimality for the solution. In one embodiment, since the algorithm maintains primal and dual solutions at each step, the optimality gap can be estimated by computing the ratio of primal and dual objective function values.

In one embodiment, for a dual formulation of the of the path flow based formulation, a variable $\omega_i$ may be associated with each node i∈N and a variable $\pi_{ij}$ may be associated with each demand constraint in Eq. 8. In one such embodiment, SP(i,j) denotes the shortest path P∈$P_{ij}$ under link costs $c(e) = \Sigma_{i: e \in N(i)} \omega(i)/u_e$. In one embodiment, following simplification of the dual linear program for removal of the dual variable $\pi_{ij}$, the dual formulation may be represented as a minimization of a summation of $\beta_i \omega(i)$ for all nodes i, subject to the following conditions (Eq. 10 and Eq. 11):

$$\sum_{i: i \neq k} R_i SP(i, k) + \sum_{j: j \neq k} C_j SP(k, j) \geq 1 \quad \forall \, k \in N \quad \text{Eq. 10}$$

$$\omega(i) \geq 0 \quad \forall \, i \in N \quad \text{Eq. 11}$$

In one embodiment, V(k) may denote a sum of: (1) a summation of $R_i \cdot SP(i,k)$ over all nodes i (for i≠k) and k (for k∈N) and (2) a summation of $C_j \cdot SP(k,j)$ over all nodes j (for j≠k) and k (for k∈N). In one such embodiment, given weights $\omega(i)$, V(k) may be computed in polynomial time using two shortest path computations: (1) a shortest path computation for a shortest path tree with node k as the root and (2) a shortest path computation for a reverse shortest path tree reaching node k from all other nodes. As such, given a set of weights $\omega(i)$, the solution of the dual program is feasible if and only if the following inequality is satisfied: min{V(k)}≧1 for all nodes k∈N. An exemplary fast combinatorial algorithm for solving the path flow based formulation is depicted and described herein with respect to FIG. 4.

Figure 4:
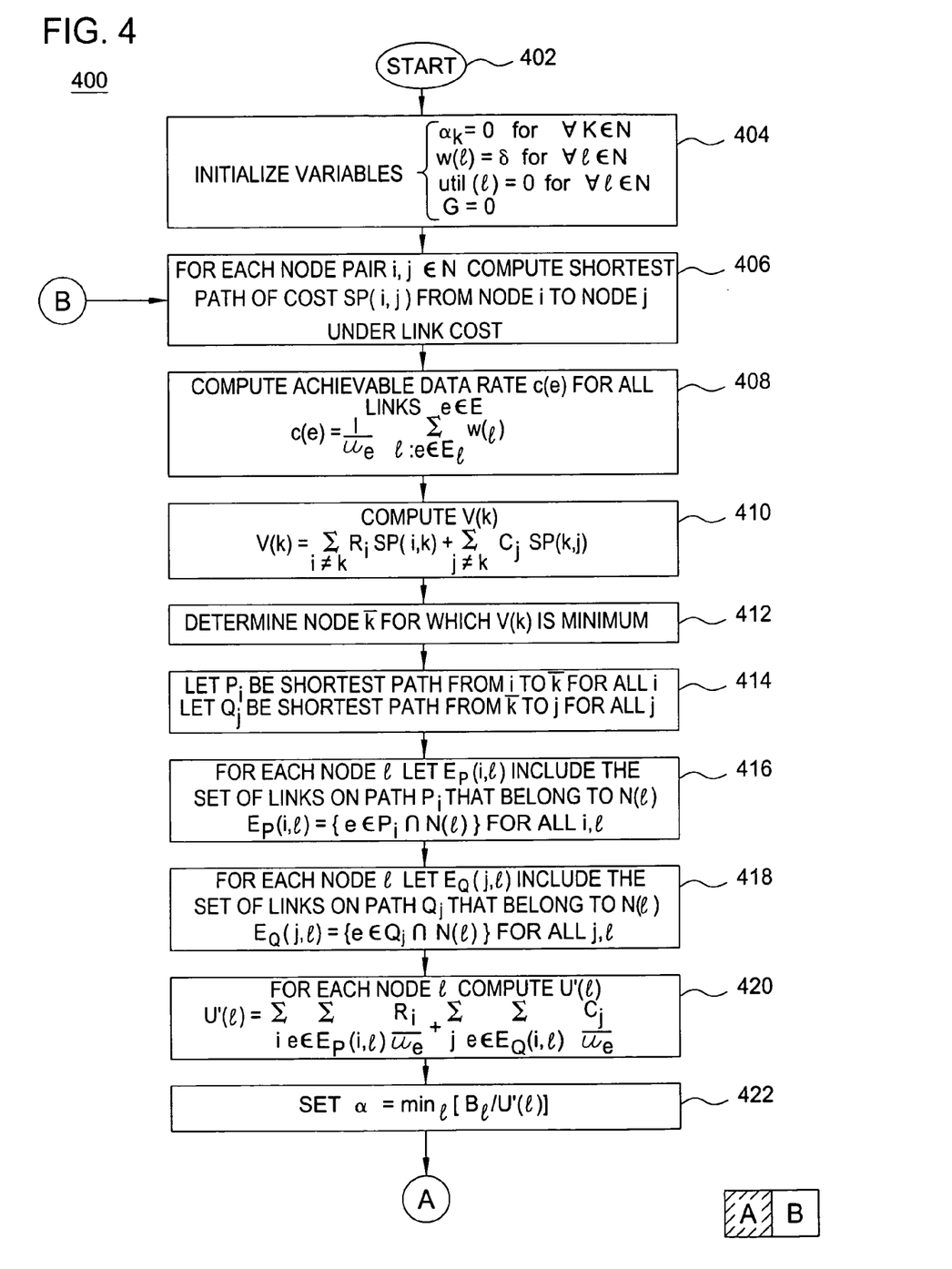
FIG. 4 depicts a method according to one embodiment of the present invention.

FIG. 4 depicts a method according to one embodiment of the present invention. Specifically, method 400 of FIG. 4 includes a method for determining traffic split ratios adapted for ensuring fixed traffic capacities on respective network links. Although described with respect to determining traffic split ratios for a specific two-phase routing algorithm, method 400 may be adapted for determining various other parameters for ensuring fixed traffic capacities on respective network links. Although depicted and described as being performed serially, those skilled in the art will appreciate that at least a portion of the steps of method 400 may be performed contemporaneously, or in a different order than presented in FIG. 4. The method 400 begins at step 402 and proceeds to step 404.

At step 402, variables are initialized. A traffic split ratio $\alpha_k$ associated with each node k is initialized to zero for each node k∈N (i.e., $\alpha_k = 0$, for all k ∈N). A weight w(l) associated with each node l is initialized to a quantity $\delta$ (i.e., $w(l) = \delta$). In one embodiment, quantity $\delta$ is dependent on error parameter ∈. A link subset utilization array util(l) maintaining link subset utilization values associated with each node l (for link subset $E_l$ associated with node l) is initialized to zero (i.e., util(l)=0). A constraint monitoring variable G is initialized to zero (i.e., G=0). The constraint monitoring variable G remains less than one as the long as dual constraints specified.

At step 406, for each node pair i,j∈N, a shortest path from node i to node j having an associated cost SP(i,j) is computed. At step 408, an achievable data rate c(e) is computed for each link e∈E. The achievable data rate c(e) is computed as: $c(e)=1/u_e \Sigma_{l:e\in E_l} \omega(l)$. At step 410, V(k) is computed. In one embodiment, V(k) is computed as a sum of: (1) a summation of $R_i \cdot SP(i,k)$ over all nodes i (for i≠k) and k (for k∈N) and (2) a summation of $C_j \cdot SP(k,j)$ over all nodes j (for j≠k) and k (for k∈N) (i.e, $$\sum_{i:i\neq k} R_i SP(i,k) + \sum_{j:j\neq k} C_j SP(k,j)$$

as depicted and described herein with respect to Eq. 10).

At step 412, node $\bar{k}$ for which V(k) is minimum is determined, thereby identifying the node $\bar{k}$, as well as the following paths: (1) paths $P_i$ from node i to node $\bar{k}$ for all nodes i and (2) paths $Q_j$ from node $\bar{k}$ to node j for all nodes j. At step 414, let $P_i$ be the shortest path from node i to node $\bar{k}$ for all nodes i and let $Q_j$ be the shortest path from node $\bar{k}$ to node j for all nodes j. At step 416, for each node l, let $E_P(i,l)$ be a set of links on shortest path $P_i$ that belong to N(l) (i.e., $E_P(i,l)=\{e\in P_i \cap N(l)\}$ for all i,l). At step 418, for each node l, let $E_Q(j,l)$ be a set of links on shortest path $Q_j$ that belong to N(l) (i.e., $E_Q(j,l)=\{e\in Q_j \cap N(l)\}$ for all j, l). At step 420, for each node l, compute U'(l) is computed as follows (Eq. 12).

$$U'(l) = \left(\sum_i \sum_{e\in E_P(i,l)} \frac{R_i}{u_e}\right) + \left(\sum_j \sum_{e\in E_Q(j,l)} \frac{C_j}{u_e}\right) \quad \text{Eq. 12}$$

At step 422, traffic split ratios are set. In one embodiment, traffic split ratios are set according to: $\alpha=\min_l(\beta_l/U'(l))$. At step 424, using traffic split ratios α, $\alpha R_i$ amount of flow is sent on path $P_i$ for all nodes i and $\alpha C_j$ amount of flow is sent on path $Q_j$ for all nodes j. At step 426, total utilization of link subset N(l) (denoted as U(l)) due to flow on path $P_i$ and flow on path $Q_j$ is computed for all nodes l in N. In one embodiment, total utilization U(l) is computed as $U(l)=\alpha U'(l)$. At step 428, total utilization for link subset N(l) for all nodes l (denoted as util(l)) is incremented using total utilization U(l) (i.e., util(l)=util(l)+U(l)).

At step 430, link weights ω(l) are updated for all nodes l in N. In one embodiment, link weights ω(l) are updated as $\omega(l)=\omega(l)(1+\epsilon U(l)/\beta_l)$. At step 432, traffic split ratio $\alpha_{\bar{k}}$ associated with node $\bar{k}$ is incremented by a (i.e., $\alpha_{\bar{k}}=\alpha_{\bar{k}}+\alpha$). At step 434, a determination is made as to whether a constraint (or, in the case of multiple constraints, illustratively, dual feasibility constraints, each constraint) is satisfied. If the constraint is not satisfied, method 400 returns to step 406, at which point a significant portion of method 400 is repeated in an attempt to satisfy the constraint. If the constraint is satisfied, method 400 proceeds to step 436.

At step 436, a scaling factor is computed. In one embodiment, the scaling factor is computed due to a possibility that capacity constraints on each link will be violated (since the algorithm is using the original link capacities, as opposed to residual link capacities). In this embodiment, in order to correct for violation of capacity constraints on each link, traffic split ratios α may be scaled down uniformly such that link capacity constraints are obeyed. In one embodiment, the scaling factor may be computed as: SCALE- $$\text{FACT} = \max_{l\in N}[util(l)/\beta_l].$$

At step 438, optimum traffic split ratios $\alpha_k$ are computed for all nodes k∈N. In one embodiment, optimum traffic split ratios α are computed as: $\alpha_k=\alpha_{\bar{k}}/\text{SCALE-FACT}$. In one embodiment, in which traffic split ratios $\alpha_{\bar{k}}$ do not violate link capacity constraints, steps 436 and 438 may be omitted. At step 440, method 400 ends. As described herein, in one embodiment, optimum traffic split ratios $\alpha_k$ may be used in conjunction with ingress traffic capacities and egress traffic capacities associated with each node k for determining fixed traffic capacities associated with respective links e for a specific routing protocol for which traffic split ratios $\alpha_k$ are determined. In this embodiment, the routing protocol and associated fixed traffic capacities may be used for generating a link transmission schedule.

In one embodiment, the present invention provides node-level destination-oblivious throughput commitments adapted for use by higher layers in providing application-level quality-of-service guarantees in various different service models. In one embodiment, the present invention provides bandwidth guarantees such that applications utilizing basic service classes may utilize the bandwidth guarantees for providing end-to-end quality of service guarantees to the applications. The basic service classes may include (1) end-to-end bandwidth guaranteed services in which the traffic destination is known at the traffic source and (2) bandwidth guaranteed rendezvous-based services in which the traffic destination is not known at the traffic source. The present invention permits independent or concurrent implementation of end-to-end bandwidth guaranteed services and bandwidth guaranteed rendezvous-based services within a wireless mesh network.

In general, end-to-end bandwidth guaranteed services provide basic primitives over which more complex applications may be implemented. In one embodiment, by making assumptions regarding sizes of buffers at the nodes in the network, bandwidth requirements may be translated into delay or loss requirements. In one embodiment, bandwidth guaranteed unicast service may be provided using the present invention, enabling a wireless mesh network to support bandwidth guaranteed point-to-point traffic. In one embodiment, bandwidth guaranteed multicast service may be provided using the present invention, enabling a wireless mesh network to support bandwidth guaranteed point-to-multipoint traffic. In one embodiment, natural constraints may exist on the total number of bandwidth guaranteed connections that may originate or terminate on a node in the wireless mesh network. Although primarily described herein with respect to unidirectional connections, the present invention may be utilized for handling bidirectional connections.

In general, bandwidth guaranteed rendezvous services utilize rendezvous-based communication in which the traffic source and the traffic destination are decoupled. In one embodiment, in rendezvous-based communication (e.g., developed from Internet Indirection Infrastructure (i3)), a source node sends packets to a rendezvous node (i.e., intermediate node) using a logical identifier and destination nodes express interest in packets sent to a logical identifier. In this embodiment, communication between source nodes and destination nodes over the wireless mesh network is through rendezvous nodes. In one embodiment, in a single wireless mesh network, a peer-to-peer routing protocol (e.g., Chord) is not required for routing packets between the source nodes and rendezvous nodes between the rendezvous nodes and destination nodes).

In one embodiment, the present invention determines the optimal locations of rendezvous nodes within the wireless mesh network, as well as communication paths between all nodes in the wireless mesh network and all rendezvous nodes in the wireless mesh network for maximizing network throughput. In one such embodiment, the present invention supports the rendezvous-based communication services with bandwidth guarantees (unlike i3 which is a best-effort service). In one embodiment, multicasting, anycasting, mobility, and like functions, as well as various combinations thereof, may be supported on a rendezvous-based infrastructure utilizing the present invention.

In one embodiment, to support rendezvous-base communication, traffic from the source nodes to the rendezvous nodes cannot depend on the destinations nodes (since destination nodes associated with packets are unknown at the source nodes). In one embodiment, to support rendezvous-base communication, traffic from the source nodes to the rendezvous nodes, as well as traffic from the rendezvous nodes to the destination nodes, must be routed along bandwidth-guaranteed paths. In one such embodiment, in order to avoid reconfiguration, the bandwidth-guaranteed paths cannot be re-routed in response to changes in traffic patterns, and must have sufficient bandwidth to handles all possible traffic patterns subject to associated node guarantee constraints.

Although primarily described herein with respect to a specific constraint (utilization commitment vector $\beta$), in one embodiment, the present invention may be extended to account for sophisticated link interference constraints, multiple channels, multiple antennas, routing with diversity requirements, and the like, as well as various combinations thereof. In such embodiments, although respective algorithms required for determining optimum traffic split ratios producing fixed traffic capacities on network links may vary according to the constraints, network links still transport fixed traffic capacities, thereby obviating the need for dynamic link transmission scheduling. In one embodiment, the present invention may be extended to configurations in which the traffic destination may not be known at the traffic source, such as for providing overlay services with throughput guarantees over a wireless mesh network.

Figure 5:
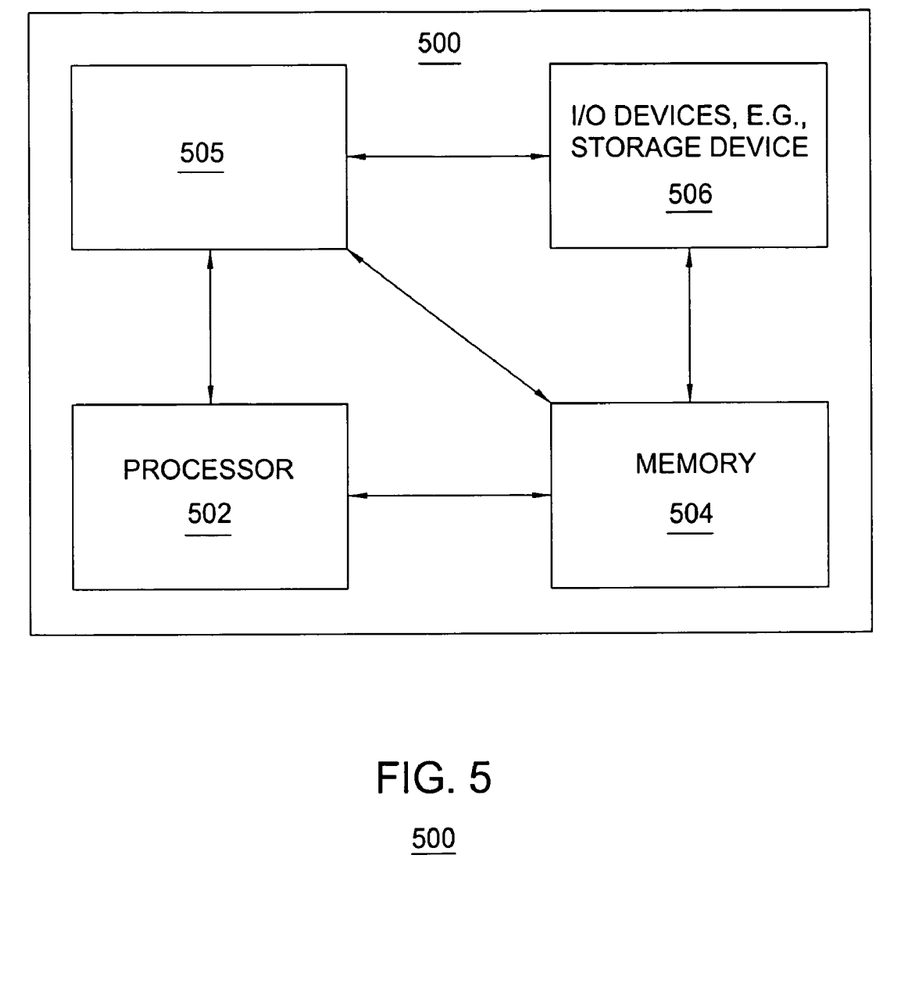
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), a link transmission scheduler module 505, and various input/output devices 906 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present link transmission scheduler process 505 can be loaded into memory 504 and executed by processor 502 to implement the functions as discussed above. As such, link transmission scheduler process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A computer-readable storage medium containing a program which, when executed, performs a method for generating a link transmission schedule, comprising:
   determining fixed traffic capacities associated with each of a respective plurality of wireless links according to a routing algorithm comprising a two-phase routing algorithm in which traffic is distributed according to traffic split ratios; and
   generating, using the routing algorithm and the determined fixed traffic capacities, the link transmission schedule comprising at least one condition by which traffic is transmitted using each of the wireless links, wherein the link transmission schedule is configured to remain substantially fixed during dynamic traffic changes.

2. The method of claim 1, wherein determining the fixed traffic capacities comprises:
   determining at least one routing parameter for configuring the routing algorithm to establish the fixed traffic capacities on the respective network links.

3. The method of claim 2, wherein the at least one routing parameter is determined in a manner for satisfying at least one scheduling constraint.

4. The method of claim 3, wherein the at least one scheduling constraint comprises at least one of a utilization commitment vector constraint, a transmission power constraint, a cross-provider conflict constraint, a radio transmit/receive diversity constraint, or a link interference constraint.

5. The method of claim 2, wherein the routing algorithm is a two-phase routing algorithm comprising a first phase during which each of a plurality of nodes distributes traffic to each of the nodes according to a respective plurality of traffic split ratios.

6. The method of claim 5, wherein the two-phase routing algorithm comprises a second phase during which each of the nodes routes traffic received during the first phase to selected ones of the node comprising destination nodes of the traffic.

7. The method of claim 5, wherein determining the at least one routing parameter comprises determining the respective traffic split ratios associated with each of the nodes.

8. The method of claim 1, wherein determining the fixed traffic capacities comprises:
   determining an ingress traffic capacity associated with each node;
   determining an egress traffic capacity associated with each node;
   determining a plurality of traffic split ratios associated with each node; and
   determining the fixed traffic capacities using the ingress traffic capacities, the egress traffic capacities, and the traffic split ratios.

9. The method of claim 1, wherein the link transmission schedule is generated using a link scheduling algorithm.

10. The method of claim 1, wherein the at least one condition by which each of the network links transmits traffic comprises at least one of a time slot, a transmission frequency, a transmission power, and a receiver.

11. An apparatus for generating a link transmission schedule, comprising:
    means for determining fixed traffic capacities associated with each of a respective plurality of wireless links according to a routing algorithm comprising a two-phase routing algorithm in which traffic is distributed according to traffic split ratios; and means for generating, using the routing algorithm and the determined fixed traffic capacities, the link transmission schedule comprising at least one condition by which traffic is transmitted using each of the wireless links, wherein the link transmission schedule is configured to remain substantially fixed during dynamic traffic changes.

12. The apparatus of claim 11, wherein the means for determining the fixed traffic capacities comprises:

means for determining at least one routing parameter for configuring the routing algorithm to establish the fixed traffic capacities on the respective network links.

13. The apparatus of claim 12, wherein the at least one routing parameter is determined in a manner for satisfying at least one scheduling constraint.

14. The apparatus of claim 13, wherein the at least one scheduling constraint comprises at least one of a utilization commitment vector constraint, a transmission power constraint, a cross-provider conflict constraint, a radio transmit/receive diversity constraint, or a link interference constraint.

15. The apparatus of claim 12, wherein the routing algorithm is a two-phase routing algorithm comprising a first phase during which each of a plurality of nodes distributes traffic to each of the nodes according to a respective plurality of traffic split ratios.

16. The apparatus of claim 15, wherein the two-phase routing algorithm comprises a second phase during which each of the nodes routes traffic received during the first phase to selected ones of the node comprising destination nodes of the traffic.

17. The apparatus of claim 15, wherein the means for determining the at least one routing parameter comprises means for determining the respective traffic split ratios associated with each of the nodes.

18. The apparatus of claim 11, wherein the means for determining the fixed traffic capacities comprises:

means for determining an ingress traffic capacity associated with each node;

means for determining an egress traffic capacity associated with each node;

means for determining a plurality of traffic split ratios associated with each node; and means for determining the fixed traffic capacities using the ingress traffic capacities, the egress traffic capacities, and the traffic split ratios.

19. The apparatus of claim 11, wherein the link transmission schedule is generated using a link scheduling algorithm.

20. The apparatus of claim 11, wherein the at least one condition by which each of the network links transmits traffic comprises at least one of a time slot, a transmission frequency, a transmission power, and a receiver.

21. A computer-readable storage medium containing a program which, when executed, performs a method, comprising:

receiving a link transmission schedule determined using a routing algorithm comprising a two-phase routing algorithm in which traffic is distributed according to traffic split ratios and a plurality of fixed traffic capacities associated with a respective plurality of network links, wherein the link transmission schedule defines at least one condition by which traffic is transmitted over each of the network links, wherein the link transmission schedule is adapted to remain substantially fixed during dynamic traffic changes; and transmitting traffic over the network links using the routing algorithm and the link transmission schedule.

\* \* \* \* \*